United States Patent Office 3,390,993

Patented July 2, 1968

3,390,993

CONDENSATION PRODUCT OF A DIAZO-DIPHENYLAMINE WITH AN ALDEHYDE IN THE PRESENCE OF HBr FOR SCREEN PROCESS PRINTING

Henning H. Borchers, Mountainside, N.J., assignor to Azoplate Corporation, Murray Hill, N.J., a corporation of New Jersey No Drawing. Continuation-in-part of application Ser. No. 129,553, Aug. 7, 1961. This application Nov. 22, 1965, Ser. No. 509,193

The portion of the term of the patent subsequent to Apr. 19, 1983, has been disclaimed 17 Claims. (Cl. 96—36.4)

ABSTRACT OF THE DISCLOSURE

The present invention relates to a material and process for screen process printing and mimeographing. The material comprises a colloid-containing emulsion, sensitized with at least one condensation product of at least one diazo-diphenylamine with at least one aldehyde condensed in the presence of hydrobromic acid, and a highly porous carrier presensitized with the emulsion.

This application is a continuation-in-part of application Ser. No. 129,553, filed Aug. 7, 1961, now Patent No. 3,246,986.

It is well known in the field of planographic printing plates to sensitize colloid layers with diazo compounds. However, planographic printing plates comprise a non-porous carrier material, e.g., metal foils or pretreated paper, and a very thin, light-sensitive layer coated thereon. In using this material, the light-sensitive layer is differentiated, by means of light and a developing step, into areas which are hydrophilic and areas which are hydrophobic and accept greasy ink. With such a surface, prints can be made in the well known offset printing method.

Previously in the practice of screen process printing, the colloid layer used was sensitized practically exclusively with dichromates because best results have been obtained therewith. In the screen printing process, a highly porous carrier material, usually a screen, made of synthetic or natural fibers or metal is stretched on a frame. The screen is coated with a colloid solution containing a sensitizer, and the coating operation is performed in such a manner that the coating solution fills the screen meshes without the formation of pin-holes in the coating.

After drying the coating, it is exposed to light under a master, whereby the colloid coating is hardened in those portions of the layer struck by light. The hardening is proportional to the degree of transparency of the master. On those portions of the coating not struck by light, the colloid layer remains soluble and is removed, for example, by a water spray; the development results in opening of the carrier pores in those portions not struck by light so that in the subsequent printing process the ink or dye can be forced, by means of a squeegee, through these openings onto the material to be printed, in a pattern corresponding to the master used.

The light exposure of a bichromate sensitized screen is difficult since, on the one hand, it is advantageous to expose to light for a substantial period to effect a good hardening of the coating. However, on the other hand, if the exposure to light is too long, a loss of detail in the image results. Thus, in a screen which has been exposed to light too long, portions of the coating under the image become hardened so that the image becomes partially clogged. Therefore, the exposure time of the dichromate sensitized screens must be controlled in a narrow range in order to obtain a sufficient hardening of the coating, which is a prerequisite for attaining a large number of prints and, on the other hand, not too long in order to avoid the closing up effect and accompanying loss of detail.

Furthermore, screens sensitized with dichromate have the great disadvantage of hardening colloids even in the absence of light. This effect known as "dark hardening" makes it mandatory that the coated screens must be processed within a short time, usually within several hours after coating, otherwise development will no longer be possible. Thus, screens cannot be coated in advance which creates quite a number of manufacturing problems. If, for instance, during printing a screen becomes accidentally damaged, it takes several hours to make a replacement, so that very often a spare must be made as a standby which is a costly procedure. Furthermore, if screens are to be stored for rerun, the unreacted dichromate, which is always present, continues its hardening effect even when the screen is stored in the dark resulting in time in a brittle stencil which cracks or crazes and thus becomes useless. Further, the dichromates have the great disadvantage of being poisonous.

In solution, the dichromates also degrade many colloids even in the absence of light which causes a progressive decrease in the viscosity of dichromate-sensitized emulsions. Therefore, the coating techniques must be adjusted frequently in order to obtain equal deposits.

A further effect of importance in the screen process printing field is the so-called bridging effect. On the margins of the images on the screen, the film deposited should bridge the space between the strands of the screen. Screen printing stencils prepared in the conventional manner are usually of low bridging properties and do not correspond exactly to the master used, which means that a straight line in the master results in a saw-toothed line following the strands of the screen, especially when the margin of the image is at a bias to the screen strands. Therefore, during the printing process, unclear prints are obtained.

Accordingly, great interest exists in an improved sensitized emulsion which overcomes the many shortcomings of the conventional products.

In accordance with the present invention, a material is provided, for screen process printing, comprising a colloid-containing emulsion, in which the sensitizer comprises at least one condensation product of at least one diazo-diphenylamine with at least one aldehyde, condensed in the presence of hydrobromic acid, and a highly porous carrier presensitized with the emulsion in which both the emulsion and the resulting presensitized carrier overcome the aforementioned shortcomings of known products.

Highly porous carrier materials used in the screen process printing art and in mimeographing are especially screens or fabrics made of polyamides, polyurethanes, polyvinyl chloride, polyvinylidene chloride, polyesters, silk, cotton, linen, organdy or metals such as copper, brass, bronze, and stainless steel. The screens used generally have the number 60 to 450 or more. The number, or mesh, refers to the openings per linear inch and is measured from the center of any given wire to a point one inch away therefrom. For example, number 80 square mesh cloth would have 80 x 80 openings per square inch or 6400 openings per square inch. Highly porous papers, such as so-called Japanese tissue or simliar materials are also suitable carrier materials when having a porosity range from about ½ to about 40 seconds, as determined by a modified Gurley tester with a ¼ sq. inch orifice, a cylinder of 400 ml. volume and a 5 oz. cylinder load.

For the preparation of the light-sensitive coating, various colloids can be used. Very suitable colloids are e.g. polyvinyl alcohol, partially acylated polyvinyl alcohol, partially hydrolyzed polyvinyl acetate, partially acetylated polyvinyl alcohol, partially acetylated acylated polyvinyl alcohol, polyacrylic acid, methyl cellulose and gelatin.

The synthetic colloids, e.g., polyvinyl alcohol, polyvinyl ester, e.g., polyvinyl acetate, polyvinyl butyrate, etc., as well as partial saponification products and mixtures thereof are especially advantageous. It is possible to incorporate in the colloids also various plasticizers, e.g., tricresylphosphate, phthalic acid ester, such as dibutyl phthalate, dioctyl phthalate and butyl benzyl phthalate; fillers, such as powdered glass, silica, clay, silica gel, aluminum oxide and finely divided plastic powders such as polyamides, polyesters, and vinyl polymerizates, such as polystyrene, polyvinyl chloride, and polyvinylidene chloride. Pigments and dyestuffs may also be added.

The colloids are sensitized with the condensation product of at least one diazo diphenylamine with at least one aldehyde condensed in the presence of hydrobromic acid. Such condensation products are isolated in the form of a neutral or acid metal salt-free bromide. Quite unexpectedly, it was found that such compounds hardened certain colloids in a fashion such that stencils for the silk screen process are obtained which outperform in many ways stencils prepared according to the conventional manner, using dichromates as sensitizers.

The diazo bromide sensitizers of this invention are not completely water-soluble as are the sensitizers claimed in application Ser. No. 129,553, filed Aug. 7, 1961, but, instead, have a solubility in water of less than 50 grams per 100 ml.

Chromatograms prepared from sensitizers which have been found operable show that condensation products of different molecular weights can be successfully used. Even dimeric condensation products have proven to be very useful sensitizers.

The term "diazo diphenylamine" includes mono- or polysubstituted products, e.g., substitutions by lower alkyl radicals such as methyl, ethyl, propyl, butyl, and amyl; lower alkoxy radicals such as methoxy, ethoxy, propoxy, butoxy, and amyloxy; carboxy, nitro and halogens such as fluorine, chlorine, and bromine. It is apparent that nearly every salt of diazo diphenylamine can be used for the reaction. For practical purposes, and also because they have shown best results, the easily accessible diazo salts, such as the halides, are used.

The diazo diphenylamines are reacted with at least one aldehyde. Generally, lower aliphatic aldehydes are used or mixtures thereof, e.g. acetaldehyde, propionaldehyde, butyraldehyde, isobutyraldehyde, and especially formaldehyde. The aldehydes are used as such or in solution in a suitable solvent or as compounds which form the aldehyde under reaction conditions, e.g., paraldehyde, paraformaldehyde and trioxymethylene.

The condensation is performed using hydrobromic acid as a condensing agent. The acid is used in a concentration which causes no substantial destruction of the reactants. On the other hand, the concentration of the acid should not be so low that no reaction occurs. Generally, the acid is used in concentrations ranging from about 20 to 68 percent, preferably from about 35 to about 65 percent. The concentration of the acid varies depending upon the degree of condensation desired. The latter also can be influenced by the ratio of reactants employed.

To effect the condensation, the reactants and hydrobromic acid are mixed, usually at room temperature while stirring. The temperature is maintained below 100° C., preferably below 60° C. It is possible to carry out the reaction at temperatures below 5° C. However, it is most practical to work at temperatures above 25° C., preferably about 50° C., to shorten the reaction time; the latter varies from an hour to a day, usually from a few hours to about half a day.

The proportion of diazo-diphenylamine to aldehyde used in the condensation reaction ranges from about 0.5 to 3 moles of aldehyde per mole of diazo-diphenylamine, preferably from about 0.8 to about 1.5 moles of aldehyde per mole of diazo-diphenylamine. The hydrobromic acid used as the condensation agent is used in a quantity permitting mechanical agitation of the reaction mixture. Generally, the hydrobromic acid is used in an amount sufficient that at least one of the reactants is dissolved. It is also possible to use the acid in an amount more than sufficient for the solution of all reactants, but, generally, no advantage is obtained. Preferred is a relatively high concentration of the reactant in the condensation medium. While stirring, the reactants are added to the hydrobromic acid step-by-step, simultaneously or in succession, or the hydrobromic acid is poured on the mixture of the reactants.

The condensation products can be used as is or isolated and purified by using well known chemical methods, e.g., it is possible to distill off the acid, preferably in a vacuum whereby the condensation product remains as a residue, usually in the form of a highly viscous oil or a resin. It is also possible to precipitate the condensation product by adding a suitable solvent, e.g., a lower alcohol. For the condensation reaction, it is possible to use different salts of the diazo-diphenylamine, but for practical purposes inexpensive and easily obtainable salts such as the halides are used.

The sensitized colloid solution used for coating the silk screen carrier material is prepared, e.g., as follows: A stock solution of the colloid is first prepared by dissolving the colloid in a solvent, while stirring vigorously. Depending upon the kind of colloid, and its end use, usually solutions containing from about 5 to about 40 percent colloid are prepared, and then, by the addition of more solvent, adjusted to the desired viscosity.

Commercially available dispersions of water-insoluble colloids, e.g., polyvinyl acetate dispersion having a solid content of about 40 to 60 percent can also be used. Advantageously however, a plasticizer is added to such a dispersion in an amount ranging from about 1 to about 30 percent, preferably from about 2 to about 15 percent by weight calculated on the solid content of the dispersion. The basic colloid solution described above is often used in the form of mixtures of different colloids in different proportions and mixed with dispersions of one or more water-insoluble colloids to obtain optimum properties for special applications in the screen process printing field, such as may be required for printing onto various materials or with specialized paints or dyes. In the field of silk screen printing on textiles, in which alkaline vat dyestuffs are used, colloids which are resistant to aqueous alkali and which are not too hydrophilic, e.g., polyvinyl acetate or butyrate or mixtures which contain a predominating part of polyvinyl acetate or butyrate or polyvinyl acetals are generally used, whereas a higher proportion of polyvinyl alcohol may be preferable when oil-based paints are to be used.

The colloids are sensitized by the addition of one or more of the condensation products described above, which is added in such an amount that the resulting sensitized colloid solution, usually called an emulsion, has a content of sensitizer from about 1 to about 20, preferably from about 5 to about 15 percent, by weight based on the solid content of the solution.

Such a sensitized emulsion can be stored, in the absence of light, at room temperature for weeks; in a refrigerator for months without a substantial change in the properties thereof.

For the preparation of screens, a highly porous carrier material, usually stretched on a frame, is coated with the sensitized emulsion, advantageously after cleaning the carrier material. The coating is performed, e.g., by brushing the sensitized emulsion onto the highly porous carrier, uniformly distributing it over the carrier and removing the excess of emulsion so that a uniform coating is obtained. Generally, a coating is desirable in which the carrier is encased in the sensitized emulsion. Subsequently, the solvent of the sensitized emulsion is removed, usually by volatilizing in a drying oven. If an especially thick coating is desired, the coating process is repeated. Instead of brushing the sensitized emulsion on the highly porous carrier, any other suitable coating method may be used, e.g., spray-coating or coating by means of rollers or troughs. The presensitized screen process printing material prepared in the manner described above can be stored in the absence of light at room temperature many months, in a refrigerator much longer, and afterwards used in the manner described above since no substantial change in the properties thereof occurs. This is the first known silk screen product using conventional colloids with which this result can be attained, which in itself constitutes a significant commercial progress.

For the preparation of a screen process printing form, also called a stencil, for screen process printing, the coated carrier, usually stretched on a frame, is exposed to actinic light under a master. The exposure time varies according to the sensitizer used, the distance of the light source from the material to be exposed, the intensity of the light source and the transparency of the original. The exposure to light causes a hardening of the sensitized colloid on those portions of the layer struck by light. Afterwards, the stencil is developed by washing away with water or a suitable solvent mixture those portions of the sensitized colloid layer not struck by light and therefore remaining soluble. In the developing step, an opening of the pores of the highly porous carrier material results in the unexposed areas of the colloid layer. The screen process stencil thus obtained can be used in known manner for printing on various kinds of solid materials of plane or spherical shape by forcing, by means of a squeegee, paint through the open pores of the stencil to the material to be printed.

The stencils of the invention have a substantial superiority over the stencils obtained using dichromate as a sensitizer, which hitherto has been considered the best sensitizer in the screen process printing field. It has been possible to obtain many times the number of prints compared with dichromate sensitized colloids without breakdown of the stencil. Due to the unique manner in which these sensitizers harden the colloid, the chemical resistance of the stencil obtained is by far greater compared with that obtained with dichromate, which makes it possible, by proper choice of the colloids, to use stencils according to the present invention even for screen process printing on textiles with alkali-vat dyestuffs in a simple manner eliminating the many steps required today to make a stencil for textile printing, i.e., coating the screen with a dichromate-sensitized emulsion, exposing to light under a reversed master, removal of the unexposed portion by development with water, drying, coating with a caustic resist enamel, drying this enamel for many hours, and finally scrubbing out the image area, which is a tedious operation, bridging of the stencil or in other words sharpness of the stencil image made according to the present invention is much superior compared with stencil obtained from dichromate-sensitized colloids. In fact, the quality of the image surpasses in many instances the indirect screen process method using carbon tissue. This also is the first time in silk screen history that a stencil can be made by the direct silk screen process using conventional colloids which matches and even surpasses the print definition attainable to date only by the indirect method and, at the same time, permits a length of run in excess of many tens of thousands of prints, which is characteristic of the direct screen process method. Thus, highest quality with great screen durability can now be obtained, which also constitutes a significant progress.

Again, due to the unique manner in which the sensitizers of this invention harden the colloids, stencils have been made which are virtually unaffected by atmospheric fluctuations. Whereas images produced with standard dichromated commercial emulsions undergo dimensional changes depending upon atmospheric conditions, it is now possible by proper choice of colloids and sensitizers to produce images which change only insignificantly when exposed even to the most adverse atmospheric conditions. Thus, for instance scales can now be reproduced by the silk screen method in an accuracy unknown heretofore in the silk screen printing process. It further introduces the possibility to use the silk screen process for multi-color register work. Again, this is the first time such results have been attained with conventional type colloids and constitutes a further significant commercial progress.

The condensation products of diazo-diphenylamines with aldehydes may be prepared, for example, according to the disclosure of application Ser. No. 207,800, filed July 5, 1962, now Patent No. 3,277,074, which application is a continuation-in-part of application Ser. No. 124,805, filed July 18, 1961, and now abandoned.

The invention will be further illustrated by reference to the following specific examples:

EXAMPLE 1

A series of tests was run in order to show the superiority of various acid and neutral diazonium bromides and chloride-bromides as sensitizers over the previously used dichromates for preparing stencils for use in the screen process printing.

In this series of tests, a commercial silk screen emulsion, containing polyvinyl alcohol, polyvinyl acetate, and small quantities of plasticizers, and having a total solids content of approximately 38% was used. This emulsion, marketed under the name of "Wittol," and supplied by the Active Supply Company of New York City, was sensitized by admixing the diazo sensitizer to be evaluated. For comparison, the emulsion was admixed also with ammonium dichromate in the concentration recommended by the supplier, i.e., 3.6 grams of ammonium dichromate dissolved in 20 ml. of water per 100 grams of emulsion. The thus sensitized emulsions were applied to 196 mesh standard screen process nylon, purchased from Drakenfeld of New York city. The coating was brushed onto one side and then onto the other side of the screen, the excess being removed first from one side and then from the other with a stiff scraper using even pressure in order to obtain a uniform coating of uniform thickness. Only one coat was applied. The coatings were then allowed to dry for one hour in a dust free cabinet at a temperature of 30 to 40° C. at which time the screens were exposed in the conventional manner to a test film, using a standard arc lamp.

Development was effected in the standard manner by spraying the image with a jet of warm water. After development, the screens were dried and judged for image quality. The abrasion resistance and resiliency of the screen was tested on a specially constructed device in which the screen was suspended firmly in a frame with a clearance of the screen to the bottom page of ⅛ inch.

A copious quantity of paint consisting of squeegee oil, No. 175, supplied by Drakenfeld, into which was blended an abrasive pigment, was poured onto the screen. (Squeegee oils are defined as oils free of tarry or carbon residue which must volatilize within a very narrow range. They are used mainly for decorating ceramics. On subsequent firing the oils must volatilze completely and leave no traces of a tarry or carbon residue since this would impair the color and also cause the design to blister.) A neoprene squeegee was then wedged firmly between the screen and the squeegee carrier. This squeegee was moved alternately back and forth across the stencil by the means of a reciprocating rod attached to a motor driven wheel. The number of strokes was determined with an automatic counter and, at the end of each 1,000 strokes, the screen was removed, washed out and a print on high gloss paper was made. Both print quality and the appearance of the stencil were judged. If the screen was found to be perfect it was remounted into the machine and the run was continued in the manner described above. After an additional 1,000 strokes, a second test print was made and judged. This procedure was repeated until the screen began to show signs of wear.

EXAMPLE 2

The commercial silk screen emulsion described in Example 1 above was sensitized with ammonium dichromate added in the proportions described in Example 1 above.

The quality of the image produced with this emulsion was fair and, under the conditions of test described in Example 1 above, the stencil showed major breakdown at the end of 5,000 strokes.

EXAMPLE 3

The sensitizer employed in this example corresponded to the following general formula:

$$ArN_2Cl \cdot 1.7HBr$$

wherein $ArN_2$ is the condensed diphenylamine-4-diazonium unit.

The sensitizer was prepared as follows: 324 grams of hydrobromic acid (64.5% concentration) were heated to 50° C. While stirring, a mixture of 387 grams of diphenylamine-4-diazonium chloride (92% pure) and 45 grams of paraformaldehyde were added during a period of 15 minutes. Stirring was continued at this temperature for seven hours and the reaction mixture was then allowed to cool.

One gram of the condensation product was diluted with 10 ml. of water and blended into 100 grams of the commercial silk screen emulsion described in Example 1 above. Four test screens were prepared and evaluated according to the procedure described in Example 1 above.

The quality of the image produced was very good and the stencils lasted, under the test conditions described in Example 1, over three times as long as the corresponding stencils sensitized with ammonium dichromate. In fact, none of the stencils showed any signs of breakdown after 15,000 strokes.

EXAMPLE 4

The sensitizer employed in this example corresponded to the general formula $$ArN_2Cl \cdot 1.0HBr$$

wherein $ArN_2$ represents the diphenylamine-4-diazonium unit.

This sensitizer was synthesized in the same manner as described in Example 3 above. However, the condensation reaction conditions were altered in a manner such that per mole of hydrobromic acid, one mole of diphenylamine-4-diazonium chloride and one mole of paraformaldehyde were added.

Two grams of this diazo sensitizer were diluted with 10 ml. of water and blended into 100 grams of the commercial silk screen emulsion described in Example 1 above.

A test screen was prepared and the image obtained with this emulsion was very well defined. Under the conditions of the test described in Example 1, the stencil showed no breakdown after 20,000 strokes.

EXAMPLE 5

The sensitizer employed in this example corresponded to the general formula $$ArN_2Br \cdot 1.7HBr$$

wherein $ArN_2$ represents the condensed 3-methoxydiphenylamine-4-diazonium unit.

The sensitizer was prepared as follows: 237.5 grams of hydrobromic acid (64.5% concentration) was heated to 50° C. and, during a period of 10 minutes, a mixture consisting of 320 grams of 3-methoxydiphenylamine-4-diazonium bromide (90% purity) and 33 grams of paraformaldehyde were added while stirring. The mixture was then stirred for an additional 14 hours at the above temperature and then cooled.

One gram of the diazo sensitizer was diluted with 10 ml. of water and blended into 100 grams of the commercial silk screen emulsion described in Example 1 above.

Four test screens were then prepared and evaluated according to the procedure of Example 1 above. The quality of the image was outstanding and, in addition, none of the stencils showed any sign of breakdown after 15,000 strokes.

EXAMPLE 6

Instead of using only one gram of the diazo sensitizer of Example 5 above, 3 grams were used to sensitize the emulsion. Four test screens were prepared following the procedure of Example 1 above and then evaluated. It was found that this excess quantity of sensitizer did not adversely affect the quality of the image, both with regard to the excellent detail reproduced and the toughness of the stencil. No breakdown was observed after 15,000 strokes. The only difference found was that the exposure time had to be increased by approximately 30%.

This example established that the quantity of sensitizer can be considerably varied without adversely affecting the quality of the resulting stencils as long as a compensation is made by increasing the exposure time. Alternatively, a uniform exposure time can be employed and the distance between the light source and the work can be reduced, or the time of exposure and the distance between the light source and the work can be maintained uniform and a more intense source of light can be employed.

EXAMPLE 7

The sensitizer used in this example corresponded to the general formula $$ArN_2Br \cdot 1.7HBr$$

wherein $ArN_2$ represents the condensed diphenylamine-4-diazonium unit.

The sensitizer was prepared as follows: A mixture of 110.4 grams of diphenylamine-4-diazonium bromide and 12 grams of paraformaldehyde was covered with 85.4 grams of hydrobromic acid (64.4% concentration). The acid was then heated to 50° C. and maintained at this temperature for a period of 45 minutes. Then, a stirrer was inserted and the mixture was agitated for seven hours at the same temperature of 50° C. The reaction mixture was then permitted to cool.

Two grams of this sensitizer were blended into 100 grams of the commercial silk screen emulsion described in Example 1 above. A test screen prepared and tested according to the procedure of Example 1 above exhibited no breakdown after 18,000 strokes.

EXAMPLE 8

The sensitizer used in this example was prepared as follows: 138 parts by weight of diphenylamine-4-diazonium chloride and 18 parts by weight of paraformaldehyde were heated in 300 parts by volume of hydrobromic acid (66% concentration) for seven hours at a temperature of 50° C. The mixture was then evaporated to dryness under vacuum at a bath temperature of 60 to 70° C. The yield was 178 parts by weight of the acid bromide of the condensation product.

0.5 gram of the sensitizer was stirred into 100 grams of the commercial silk screen emulsion described in Example 1 above. A test screen was prepared and tested according to the procedure of Example 1 above and the stencil showed no breakdown after 25,000 strokes.

It will be obvious to those skilled in the art that many modifications may be made within the scope of the present invention without departing from the spirit thereof, and the invention includes all such modifications.

What is claimed is:

1. A presensitized material for screen process printing comprising a highly porous carrier coated with at least one colloid containing as a sensitizer at least one condensation product of at least one diazo-diphenylamine with at least one aldehyde, condensed in the presence of hydrobromic acid and having a solubility in water of less than 50 grams per 100 ml.

2. A presensitized material for screen process printing comprising a highly porous carrier coated with at least one organic colloid containing as a sensitizer at least one condensation product of at least one diazo-diphenylamine with at least one lower aliphatic aldehyde, condensed in the presence of hydrobromeric acid and having a solubility in water of less than 50 grams per 100 ml.

3. A presensitized material for screen process printing comprising a highly porous carrier coated with at least one organic colloid containing as a sensitizer at least one condensation product of diazo-diphenylamine with formaldehyde, condensed in the presence of hydrobromic acid and having a solubility in water of less than 50 grams per 100 ml.

4. A presensitized material for screen process printing according to claim 1 in which commercial polyvinyl alcohol is used as the colloid.

5. A presensitized material for screen process printing according to claim 1 in which a partially acylated polyvinyl alcohol is used as the colloid.

6. A presensitized material for screen process printing according to claim 1 in which a commercial polyvinyl acetate dispersion is used as the colloid.

7. A presensitized material for screen process printing according to claim 1 in which mixtures of polyvinyl alcohol and polyvinyl acetate are used as the colloid.

8. A presensitized material for screen process printing according to claim 1 in which mixtures of partially acylated polyvinyl alcohol and polyvinyl acetate are used as the colloid.

9. A presensitized material for screen process printing according to claim 1 in which commercial polyvinyl acetal is used as the colloid.

10. A process for the preparation of a stencil for screen process printing comprising applying to a highly porous carrier a mixture of a material selected from the group consisting of a solution and a dispersion of at least one organic colloid and, as a sensitizer, at least one condensation product of at least one diazo-diphenylamine with at least one aldehyde, condensed in the presence of hydrobromic acid and having a solubility in water of less than 50 grams per 100 ml., removing the solvent whereby a material is formed in which sensitized colloid covers at least the pores of the carrier, hardening the colloid by exposure thereof to light under a pattern, and removing the colloid from those portions of the carrier not struck by light to open the pores of the material in such portions.

11. A process for the preparation of a stencil for screen process printing comprising applying to a highly porous carrier a mixture of a material selected from the group consisting of a solution and a dispersion of at least one organic colloid and, as a sensitizer, at least one condensation product of at least one diazo-diphenylamine with at least one lower aliphatic aldehyde, condensed in hydrobromic acid and having a solubility in water of less than 50 grams per 100 ml., removing the solvent of the solution whereby a material is formed in which sensitized colloid covers at least the pores of the carrier, hardening the colloid by exposure thereof to light under a pattern and removing the colloid from those portions of the carrier not struck by light to open the pores of the material in such portions.

12. A coating composition for the preparation of a material for screen process printing comprising a mixture of a material selected from the group consisting of a solution and a dispersion of at least one colloid and a minor amount of at least one condensation product of at least one diazo-diphenylamine with at least one aldehyde, condensed in hydrobromic acid and having a solubility in water of less than 50 grams per 100 ml.

13. A coating composition for the preparation of a material for screen process printing comprising a mixture of a material selected from the group consisting of a solution and a dispersion of at least one organic colloid and a minor amount of at least one condensation product of at least one diazo-diphenylamine with at least one lower aliphatic aldehyde condensed in the presence of hydrobromic acid and having a solubility in water of less than 50 grams per 100 ml.

14. A coating composition for the preparation of a material for screen process printing according to claim 12 in which the colloid is a commercial polyvinyl acetate dispersion.

15. A coating composition for the preparation of a material for screen process printing according to claim 12 in which the colloid is a mixture of a commercial polyvinyl acetate dispersion and polyvinyl alcohol.

16. A coating composition for the preparation of a material for screen process printing according to claim 12 in which the colloid is polyvinyl alcohol.

17. A coating composition for the preparation of a material for screen process printing comprising an aqueous solution of polyvinyl alcohol and a minor amount of a condensation product of diazo-diphenylamine with formaldehyde, condensed in hydrobromic acid and having a solubility in water of less than 50 grams per 100 ml.

References Cited

UNITED STATES PATENTS 3,246,986 4/1966 Borchers ------------- 96—35

NORMAN G. TORCHIN, *Primary Examiner.*

J. TRAVIS BROWN, *Examiner.*

R. MARTIN, *Assistant Examiner.*